INVENTOR
B. McMILLAN
BY J. W. Schmied
ATTORNEY

Nov. 5, 1957 B. McMILLAN 2,812,133

ELECTRONIC COMPUTING DEVICE

Filed June 19, 1952 3 Sheets-Sheet 2

INVENTOR
B. McMILLAN
BY J.W. Schmied
ATTORNEY

INVENTOR
B. McMILLAN
BY J. W. Schmied
ATTORNEY 2,812,133
Patented Nov. 5, 1957

2,812,133

ELECTRONIC COMPUTING DEVICE

Brockway McMillan, Summit, N. J., assignor to Bell Telephone Laboratories, Incorporated, New York, N. Y., a corporation of New York Application June 19, 1952, Serial No. 294,441

19 Claims. (Cl. 235—61)

The present invention relates to an electronic computing circuit and device and more particularly to a cathode-ray tube computing circuit and device for deriving the sum of two or more numbers.

More specifically the present invention provides for an electronic adder which utilizes the binary system. The binary system of computation is particularly suited to electronic computation since a numbering system with a base or radix of two may be represented electrically by sets of dual potential conditions such as on-off, plus-minus, or high-low potentials. In one modification of the present invention the binary numbers are represented by on-off negative pulses which control the potentials of the electrodes of the target of a beam guide cathode-ray tube. An electron beam emanates from the electron gun of the beam guide tube and is automatically horizontally swept across the target as it is vertically deflected in discrete increments according to the controlled potentials upon the sixteen electrodes of the target. The complete target structure includes a vertical column of electrodes for each summand which are horizontally adjacent one another, and an output column of targets aligned along the last vertical column wherein the total or the sum is ascertained.

Each vertical column of targets associated with one of the summands is alternately connected into multiples so that two different such groups of targets appear in each vertical column or summand column. A summand column is prepared for addition of one or the other of the two binary values by making one subgroup positive or negative as the case may be with respect to the collector electrode of the beam guide tube. The individual electrodes are coated with a material which provides for a ratio greater than one of emitted secondary electrons to primary electrons at the electron beam velocity utilized. The target electrodes that are negative with respect to the collector electrode have an effective secondary emission collected by the collector electrode. The current flowing to the collector electrode is amplified by a feedback deflection amplifier, the output of which is connected to the vertical deflection plates of the cathode-ray tube. A greater amount of effective secondary emission causes the electron beam to be deflected upward and a smaller amount or no effective secondary emission causes the electron beam to be deflected downward. Thus the electron beam as it sweeps from left to right in response to a horizontal sweep voltage is vertically deflected upwards or downwards depending upon the potential of electrodes in the summand target columns until the electron beam arrives at one of the output electrode targets which provides an output pulse in accordance with the sum of the digits added.

When the beam moves upon one of the output electrodes a pulse is generated indicating the binary digit which is the sum of a respective column of digits of the summands. The carry to the next column is indicated by the final position of the electron beam after the completion of a horizontal pass. The vertical deflection after fly-back or recycle is the same as the vertical deflection at the completion of a horizontal pass.

It is then an object of the present invention to provide a novel electronic computing circuit that utilizes a beam guide tube.

A feature of the present invention is a novel electronic binary adder which performs the adding function essentially by means of a beam guide tube in which the electron beam is automatically swept as it is vertically positioned according to the binary summands.

Still another feature of the present invention is a novel cathode-ray tube in which a collector electrode is positioned in front of a multielectrode target and the electrodes of the target provide effective secondary emission thereto depending upon the potential conditions therebetween.

Still another feature of the present invention is a novel fast-acting electronic computer which performs the logical functions essentially in one electron tube.

Still another feature of the present invention is a binary computing device in which the final sum is achieved by a single pass of an electron beam across a multielectrode target.

Still another feature of the present invention is a novel beam guide tube and circuit which maintains the vertical position of the electron beam during the horizontal recycling thereof.

Still another feature of the present invention is a novel electronic binary adder in which the sum of each column that is added is provided in response to the electron beam moving upon particular output plates and the carry to the next column is indicated by the final position of the electron beam at the completion of a horizontal pass.

Still another feature of the present invention is a novel beam guide tube with a sixteen-electrode target for adding binary numbers in a rapid and accurate manner.

Still another feature of the present invention is a novel electronic binary adder having a beam guide tube which accomplishes the addition of a plurality of summands in a single pass of the electron beam across the multielectrode target.

Further objects, features and advantages will become apparent upon consideration of the following description taken in conjunction with the figures wherein.

Figure 1:
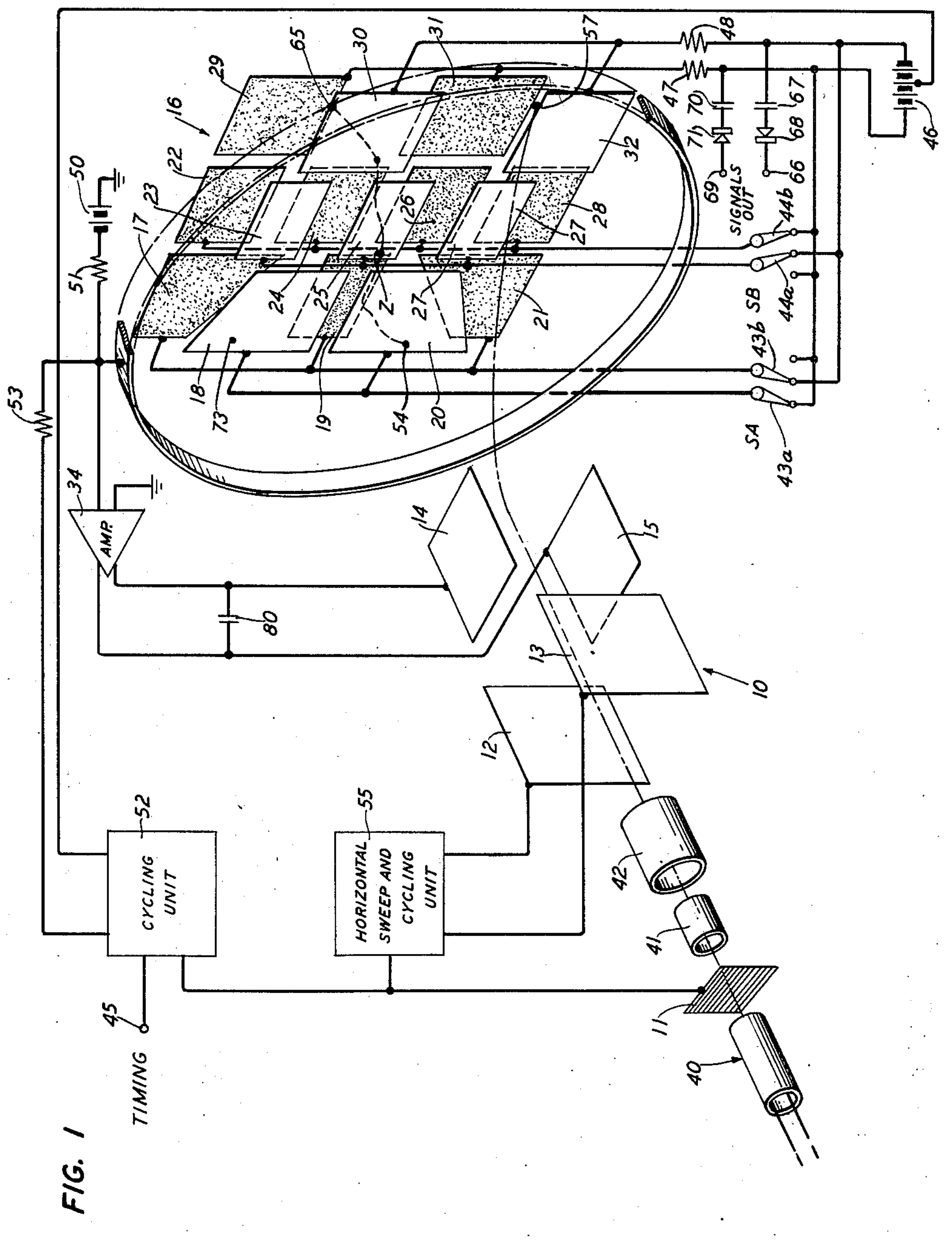
Fig. 1 is a diagrammatic view of the cathode-ray tube of the present invention with the associated circuitry shown in block diagram.

Referring to Fig. 1, the cathode-ray tube 10 has an electron gun 40 from which emanates a beam of electrons. The electron beam is focused by the electrode 41 and accelerated by the electrode 42. The stream of electrons or electron beam from the gun 40 impinges upon a target 16. The electron beam passes between the horizontal positioning plates 12 and 13 and the vertical positioning plates 14 and 15 which control the position of the electronic beam upon the target 16. Situated in front of the target 16 is collector electrode 33 which collects some of the secondary emitted electrons from the target 16 as is hereinafter described. The target 16 has sixteen physically separate plates or electrodes 17 through 32 that emit more electrons than impinge thereon. Depending upon the potential conditions between the electrodes 17 through 32 and the collector electrode 33, as is hereinafter described, the stream of electrons from the electron gun 40, impinging upon one of the electrodes 17 through 32, causes a secondary emission therefrom to the collector electrode 33. The potential conditions between the electrodes 17 through 32 and the collector electrode 33, referred to above, are determined by the switches 43 and 44 and the timing input 45. The switch 43 determines the potential of the summand plates or electrodes 17, 18, 19, 20 and 21. The electrodes 18 and 20 are connected to the contact arm 43A and the electrodes 17, 19 and 21 are connected to the contact arm 43B. When the switch 43 is positioned to the left as shown, the electrodes 18 and 20 are connected through the contact arm 43A to the left side or the positive pole of the battery 46 and the plates 17, 19 and 21 are connected through the contact arm 43B to the right side or the negative pole of the battery 46. Moving the switch 43 to the right would reverse the potential of the electrodes 17 through 21 by switching the connection across the battery 46. The electrodes 17, 19 and 21 are at one potential and the electrodes 18 and 20 are at the other potential. Similarly the summand plate or electrodes 23, 25 and 27 are connected to the contact arm 44A of the switch 44 and the electrodes 22, 24, 26 and 28 are connected to the contact arm 44B of switch 44. Moving the switch 44 reverses the potentials on the plates 22 through 28. With the switch 44 moved to the right as shown in Fig. 1, the electrodes 22, 24, 26 and 28 are connected through contact arm 44B to the positive terminal of the battery 46. The output plates or electrodes 29 through 32 of target 16, however, are connected directly to the battery 46 without going through a switch. The electrodes 29 and 31 are permanently connected to the positive terminal and the electrodes 30 and 32 are permanently connected to the negative terminal to the battery 46. The electrodes 29 and 31 are connected through the output resistor 47 and the electrodes 30 and 32 are connected through the output resistor 48, which resistors provide for the output or sum voltages as is hereinafter described.

Depending therefore upon the position of the switch 43, one of the set of electrodes 18 and 20 or 17, 19 and 21 will be at a plus potential and the other will be at a minus potential. The plus and minus potentials cover a range of approximately 50 volts, the plus potential being approximately 30 volts above and the minus potential 20 volts below the potential of the collector electrode 33. Similarly, the electrodes 22, 24, 26 and 28 or electrodes 23, 25 and 27 are plus or minus depending upon the position of switch 44. The electrodes 29 and 31 are permanent non-effective emitting surfaces to the collector 33, being connected to a plus potential and thus always positive with respect to the collector electrode 33. The electrodes 30 and 32 are permanent effective emitting surfaces being connected to a minus potential and thus always negative with respect to the collector electrode 33. The secondary electrons are repelled by the electrodes 30 and 32 and attracted by the relatively positive electrode 33. The potential of the collector electrode 33 is determined by the battery 50 and the cycling unit 52 as is hereinafter described. The battery 50 has a voltage which is between the plus and the minus voltages upon the electrodes 17 through 32 as described above and is connected to the electrode 33 through the resistor 51. The collector electrode 33 is also connected through the feedback amplifier 34 to the vertical plates 14 and 15 and thus the secondary emission produced at the surfaces of the electrodes 17 through 32 is picked up by the collector electrode 33 and translated by the feedback amplifier 34 to potentials on the vertical plates 14 and 15 which vertically position the electron beam. The collector electrode 33 is also connected to the cycling unit 52 through resistor 53, and the cycling unit 52 is in turn connected to the center tap of the battery 46 and also to an intensity grid 11.

Suppose, for example, one wishes to add the two numbers 5 and 7. The basic binary addition table provides that 0+0=0; 0+1=1+0=1; and 1+1=10.

The numbers 1 through 12, therefore, with the numerals 0 and 1 in binary notation being equal to the numerals 0 and 1 in decimal notation are, 001, 010, 011, 100, 101, 110, 111, 1000, 1001, 1010, 1011 and 1100. Similar to decimal notation, the zeros to the left of the first digit do not change the number; 001 is the same as 1.

Figure 3:
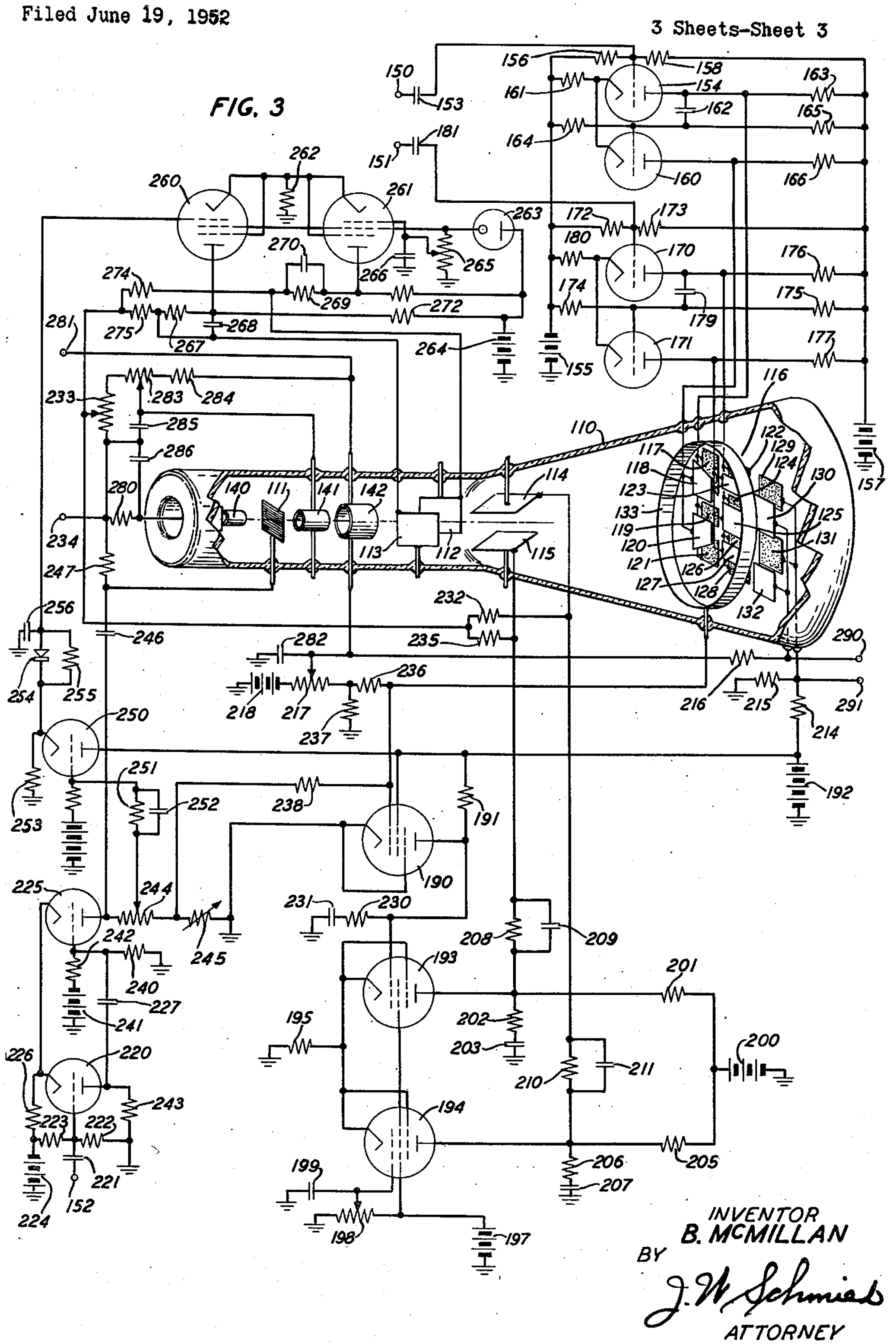
Fig. 3 is a circuit diagram of the present invention with the cathode-ray tube shown partially sectionalized.

Utilizing this basic binary addition table any two binary numbers may be added in a similar manner as is done in decimal addition. In decimal addition there is a "carry" when the addition of the rigits of two summands are too large, that is, greater than 9. The addition of 5 and 7 is 12 which is two and one to carry. This situation also arises in binary addition as 1+1=10 which is zero and one to carry. If two binary numbers are added the carry operation must be taken into account just as the carry operation is taken into account when adding decimal numbers. For example, in decimal addition the sum of 197 and 815 is 1012 with the carries being 1110 which are considered as an additional summand. Similarly, in the binary problem when adding 5 and 7, for example, which are 0101 and 0111, the carries are 1110 and the sum is 1100 or 12. The carries, therefore, are considered as an additional summand and the addition proceeds column by column starting at the right-hand or units column in which there is no carry and moving to the left considering the carry resulting from the addition of the previous column as a summand. The binary electronic adders as shown in Figs. 1 and 3 proceed to sum by following through the sequence of operations for the binary sum in the manner described above.

At the commencement of operation the beam is initially at rest at point 57 which is partially on electrode 31 and partially on electrode 32. The electrode 31, as described above, is connected to the positive terminal of the battery 46 and is positive with respect to the collector electrode 33. Any electrons occurring due to secondary emission from the electrode 31 are attracted, returning to the electrode 31, and are not collected by the collector electrode 33. Secondary emitted electrons from electrode 32, however, are attracted to and picked up by the relatively positive collector electrode 33. The collector electrode 33 is positive with respect to the electrodes 30 and 32 and of such a positive differential as to maintain a positive differential when the maximum amount of secondary emission occurs. A maximum amount of secondary emission would occur, for example, when the electron beam impinges fully upon the electrode 32, with the potential of the electrode 33 being correspondingly reduced due to the increased number of electrons on the collector 33, and yet still relatively positive with respect to electrode 32. If the electron beam moves off point 57 to impinge to a greater extent or wholly upon the electrode 32, the resultant increased secondary emission is picked up by the collector electrode 33. The collector electrode 33 provides an input to the feedback amplifier 34 which in turn provides a vertical deflection potential to the vertical plates 14 and 15 as described above. This deflection potential makes the plate 14 more positive and the plate 15 more negative and thus causes the electron beam to rise. In this manner the electron beam is returned to point 57 where only a portion of the beam effects a flow of secondary emission electrons to the collector electrode 33. If the electron beam rises and falls to a greater extent or wholly upon electrode 31 an effective secondary emission does not occure and the electrons collected by the electrode 33 are reduced. The reduction in electrons to the collector electrode 33 or the increase thereof in potential provides through the feedback amplifier a vertical deflection potential to the plates 14 and 15 which again restores the electron beam to the spot 57. The potential of plate 15 is increased and the potential of plate 14 is reduced so that the electron beam is lowered.

Figure 2:
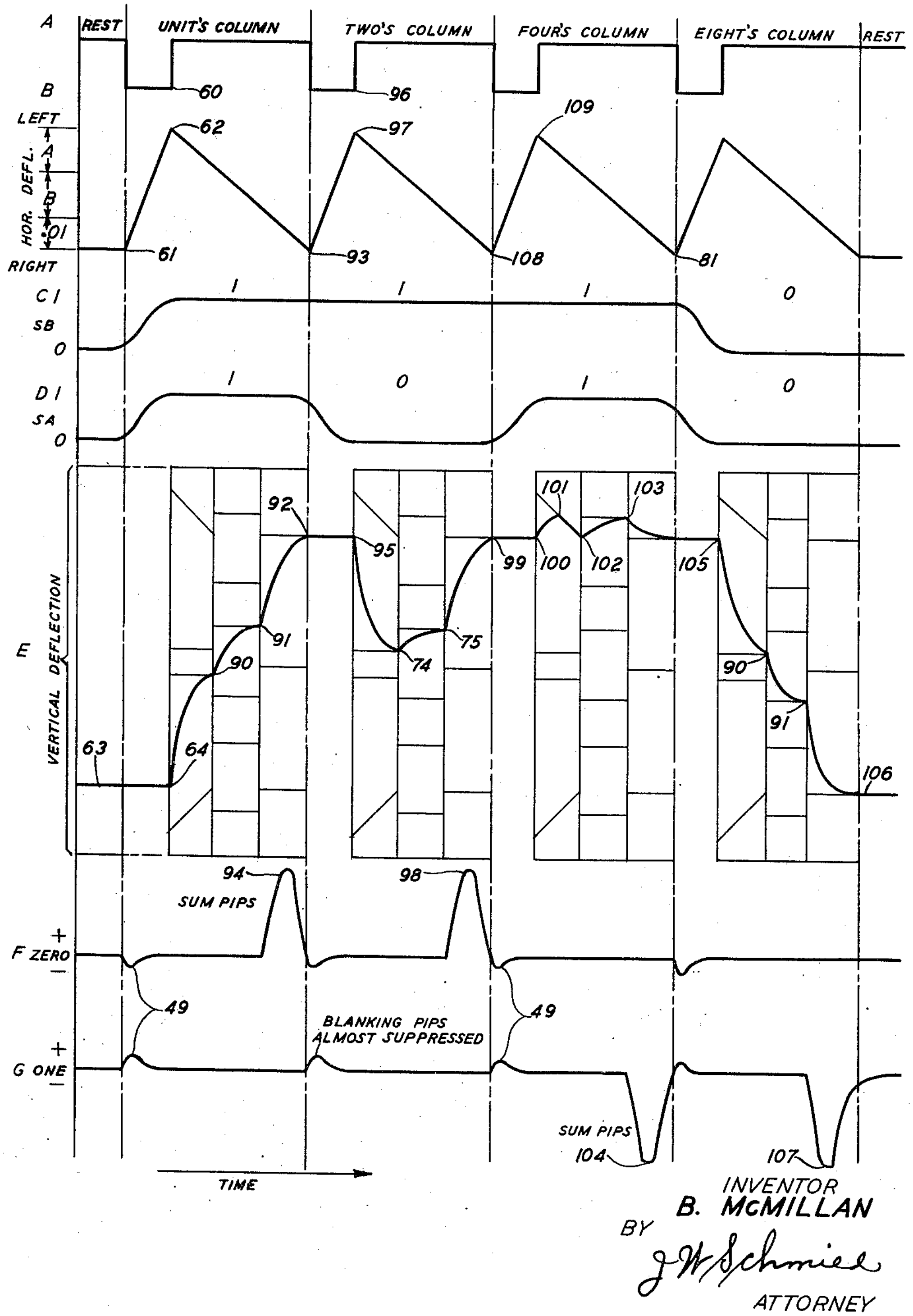
Fig. 2 is a series of voltage and deflection curves versus time illustrating the operation of the present invention.

Returning now to the problem of addition, the point 57 is therefore a point of stability. In adding the two summands 0101 and 0111 the switches 43 and 44 are at first set according to the right-hand digits of the two summands which are both 1. Setting the switch 43 or 44 to the right corresponds to an input of a 1 digit and setting them to the left corresponds to an input of a 0 digit. The switches 43 and 44 are therefore set in their right-hand positions for the present example of 0101 and 0111. A timing pulse is entered at input 45 to the cycling unit 52 which introduces a negative pulse, shown in Fig. 2A, at 60 to grid 11 which blanks the electron beam. The negative pulse 60 at the same time causes the horizontal sweep 55 to move the blanked position of the electron beam horizontally across the target to aim at point 54 on electrode 20. The movement of the beam from right to left is illustrated by Fig. 2B where the horizontal deflection from point 57 to point 54 on target 16 is illustrated from 61 to 62. The vertical deflection during this return movement from right to left is maintained without deviation in a manner, as hereinafter described with reference to Fig. 3, where no change in vertical deflection voltage upon plates 14 and 15 takes place during the fly-back or return of the electron beam. The vertical deflection is maintained partially due to capacitive effects in the circuit which are symbolically shown by capacitor 80. The vertical deflection during this time is shown in Fig. 2E as the horizontal line between points 63 and 64.

After the electron beam is moved to the left, the pulse 60 to the grid 11 is removed, and the beam is turned on to strike the electrode 20 at point 54. At the same time that the beam is turned on, the cycling unit 52 supplies a positive voltage to the collector electrode 33, and horizontal sweep commences moving the beam to the right as shown in Fig. 2B between 62 and 93. Since the electrode 20 is connected to the negative side of the battery 46 due to the right-hand position of the switch 43 as described above, effective secondary emission occurs therefrom. The electrons due to the secondary emissions that are picked up by the collector electrode 33 are translated through the feed back amplifier 34 and plates 14 and 15 into an upward movement of the electron beam. The path of travel of the electron beam across the target 16 is shown by a dotted line commencing at point 54. The beam therefore moves up across the electrode 20 simultaneously with its movement horizontally to the right. The vertical deflection versus time during this compressed period is shown in Fig. 2E between 64 and 90. The vertical deflection curve versus time curve of Fig. 2E includes a representation of the target 16 for each interval of time that the beam moves horizontally thereacross to the right. The beam reaches the top edge of the electrode 20 before it reaches the right edge thereof. Upon reaching the top edge a condition of stability occurs with regards to movement away from the top edge as the electrode 19 is connected to the positive side of the battery 46 and thus does not provide any effective secondary electrons to the collector electrode 33. The beam is restrained to the top edge in a similar manner as described above in reference to the stability at point 57. The beam therefore necessarily leaves the electrode 20 at its upper right-hand corner. Leaving the upper right-hand corner of the electrode 20 the electron beam impinges upon the electrode 25. The electrode 25 is also in an effective emitting condition due to the right-hand position of the switch 44 which connects a negative potential thereto. The potentials therefore upon the vertical deflecting plates cause the electron beam to continue to rise as shown in Fig. 1 by the dotted line and in Fig. 2E between 90 and 91. In a similar manner as described above in reference to plate 20 the electron beam impinges upon the electrode 30 passing from the upper right corner of the plate 25. The electrode 30 is permanently connected to the negative side of the battery 46 and thus is an effective secondary emitter to the collector electrode 33. The electron beam therefore continues to move upward across the electrode 30 to point 65 which is partially upon electrode 30 and partially upon electrode 29. The vertical deflection across electrode 30 is shown in Fig. 2E between 91 and 92. Whenever the electron beam moves across the electrode 30 it communicates that the sum of the first column is 0 by producing an output across the resistor 48 to the output lead 66. The output lead 66 is connected across the resistor 48 through the capacitor 67 and rectifier 68. If the electron beam impinges upon the electrodes 29 and 31 an output indication would be provided to the 1 output lead 69 through the capacitor 70 and rectifier 71 instead of to the output lead 66. The movement of the electron beam across the electrode 32 also produces a 0 output indication in a similar manner as that produced by movement across the electrode 30.

Voltages produced to leads 69 and 66 are indicated by Figs. 2G and 2F, respectively. A sum pip indicated at 94 is shown in Fig. 2F for the units column and no output indication is provided at output 69 from the units column. It is assumed that the secondary emission ratio from the various electrodes 17 through 32 of the target 16 is greater than unity and so the end effect of the beam current upon the electrode 30 is to reduce the number of electrons therein and to produce a positive pulse of voltage to the output lead or 0 signal lead 66. The rectifier or diode 68 is so poled as to pass this positive pulse. The rectifiers 68 and 71 pass only a negligible current in the reverse direction as shown in the Figs. 2F and 2G at 49.

The sum in the first column is 0 and the carry should be 1. The carry should be 1 since as described above 1+1=10 which is 0 carry 1. This information is supplied by the electronic adder of the present invention, as hereinafter described in detail, by the electron beam ending its horizontal sweep to the right on point 65. The areas on the output plates or electrodes 29 and 30 which make up point 65 are referred to as carry areas. If the horizontal movement ended at point 57 instead of at point 65, the indication would be that there is no carry.

Proceeding to the next column or the two's column in the addition of the two binary numbers, 0111 and 0101, the switch 43 is moved to the left corresponding to the 0 digit of the second column of number 101 and the switch 44 is retained in its right-hand position as shown corresponding to the 1 digit of the second column of number 111. The electron beam is blanked by the grid 11 in a similar manner as described above by an input timing pulse from the input lead 45 and the horizontal sweep 55 returns the beam to the left to point 73 upon electrode 18 as shown in Fig. 2B from 93 to 97. The vertical position of the beam is again maintained by the cycling unit 52 as hereinafter described with reference to Fig. 3, and shown between 92 and 95 in Fig. 2E. Beam current is restored by the removal of the negative potential 96, shown in Fig. 2A, from the grid 11 and the horizontal sweep 55 causes the beam to move again to the right, 97 to 108, Fig. 2B. The electrode 18 is now at a positive potential with respect to the electrode 33 due to the position of the switch 43 to the left and does not produce an effective secondary emission to the collector electrode 33. The resultant potentials upon vertical deflection plates 14 and 15 cause the electron beam to move down across the electrode 18 to the lower right-hand corner thereof. The vertical deflection across the electrode 18 is shown between 95 and 74 in Fig. 2E. From the lower right-hand corner of the electrode 18 the beam impinges as it moves to the right upon the electrode 25. The electrode 25 due to the position of switch 44 is connected to the negative side of the battery 46 resulting in an effective secondary emission and the rising of the electron beam to the upper right-hand corner of electrode 25. The vertical deflection across the electrode 25 during this time is shown between 74 and 75 in Fig. 2E. The beam in its horizontal movement to the right impinges upon the electrode 30 which is permanently connected to the negative side of the battery 46 causing the beam to move upward to point 65. The vertical deflection of the electron beam during this time is shown between 75 and 99, Fig. 2E. A 0 output indication is again provided to the output lead 66 as shown in Fig. 2F at 98 and a carry of 1 is indicated due to the final position being at point 65 instead of point 57. The units digit of the sum of the two numbers 111 and 101 is now 0 and the two's digit of the sum is also 0.

For the third column or the four's column both the switches 43 and 44 are set to the right corresponding to the one's digit in the four's column of each of the numbers 111 and 101. The electron beam is again returned to the left to point 73 in a similar manner as described above, and shown in 108 to 109, Fig. 2B. The electrode 18 is now negative with respect to the collector electrode 33 and the electron beam moves upward as shown between 100 and 101, Fig. 2E, as it is swept to the right, 109 to 81, Fig. 2B. The beam is restrained to the upper edge of electrode 18 which is shaped to cause the beam to move onto the electrode 23. The electrodes 18 and 20 have their upper and lower edges respectively at an angle to the horizontal to insure the fly-back of the beam to impinge wholly upon the electrodes 18 and 20 and to provide for their upper and lower right-hand corners, respectively, to be adjacent the center of the left-hand edge of the electrodes 23 and 27, respectively. The vertical movement is shown between 101 and 102, Fig. 2E, during the time that the beam moves along the upper edge of the electrode 18. From the upper right-hand corner of the electrode 18 the beam impinges upon the electrode 23 which also causes the electron beam to move upward, as shown in 102—103, Fig. 2E, due to the right-hand position of switch 44. From the upper right-hand corner of the electrode 23 the beam impinges upon the electrode 29. Since the electrode 29 does not provide for an effective secondary emission the beam moves downward across the electrode 29, as shown in 103 to 105, Fig. 2E, to point 65, providing through the resistor 47 a negative pulse to the output lead 69, as shown in Fig. 2G at 104. The negative pulse 104 indicates that the sum digit in the third column or the four's column is 1. Again the final position is at point 65 instead of point 57 thus indicating that there is a carry to the next column. In the last pass for the sum in the fourth column the digits of the summands are both 0 and so the switches 43 and 44 are both set to the left. This pass serves to convert the remaining carry into a sum digit. The beam is returned to the left, as shown in 81 to 83, Fig. 2B, and restored at point 73, shown in Fig. 1. Thereafter the electron beam in sweeping to the right, as shown in 83 to 84, Fig. 2B, moves down across electrode 18, as shown in 105 to 90, Fig. 2E, down across electrode 25, as shown in 90 to 91, Fig. 2E, and across electrode 31, as shown in 91 to 106, Fig. 2E, providing an output indication, 107, as shown in Fig. 2G to lead 69, as shown in Fig. 1. The pulse 107 is transmitted to the 1 output lead 69 completing the sum with the beam coming to rest at point 57 ready for a new problem. The sum of the two numbers 101 and 111 as provided by the electronic binary adder of the present invention is 1100.

The sequence of operations has been indicated for a particular problem 0101+0111=1100. It is clear however that the sequence of operations may be extended to binary numbers having any number of digits. As an alternative to blanking the beam and returning to the left of the target for each pass, two or more such target structures could be arranged in tandem, one after another (not shown). The beam, in moving once from right to left across the tandem structure, would provide the sum of the summands in a single pass. When passing across the third column of target electrodes, an indication would be provided for the units column; when passing across the sixth column of electrodes, an indication would be provided for the two's column, etc. Every third column would be an output target column.

The Fig. 1 as described above shows the various inputs and circuits in block and symbolic form. Referring now to Fig. 3 wherein is shown the specific circuitry of the present invention, the cathode-ray tube 110 is similar to the cathode-ray tube 10 described above with reference to Fig. 1 with the components 111 through 133 and 140 through 142 being similar to the components 11 through 33 and 40 through 42, respectively, of Fig. 1. The electron gun 140 is connected through the resistor 280 to the negative terminal 234, and the accelerating electrode 142 is connected to the positive terminal 281 of the accelerating potential source and also to ground through capacitor 282 and to the variable tap of the potentiometer 217, hereinafter described. The focusing electrode 141 is connected to the terminal 281 through the potentiometer 283 and the resistor 284, to the negative terminal 234 through the capacitor 285 and to the electron gun through the capacitors 285 and 286.

The operation of the binary adder is initiated from three input terminals 150, 151 and 152. The terminals 150 and 151 supply potentials corresponding to the binary numbers to be added from the input circuit or source 300 as is hereinafter described, and the input terminal 152 supplies the negative timing pulses in a similar manner as the input terminal 45 in Fig. 1. A negative pulse is entered to the terminals 150 and 151 from source 300 when a 1 digit is indicated and a zero potential entered when the 0 digit is indicated. The terminal 150 is connected through the coupling capacitor 153 to the grid of triode 154 which is part of a flip-flop circuit with the triode 160. The grid of triode 154 is also connected to the negative battery 155 through the resistor 156 and to the positive battery 157 through the resistor 158. The resistors 158 and 156 act substantially as a voltage divider across a potential which is equal to the sum of the potentials due to the batteries 155 and 157. The cathode of triode 154 is coupled to the cathode of the triode 160 and also to the battery 155 through the cathode resistor 161. The plate of triode 154 is coupled to the grid of triode 160 through the coupling capacitor 162 and is connected to the battery 157 through the plate resistor 163 and to the electrodes 117, 119 and 121 of the target 116. The grid of triode 160 is connected to the junction between the resistors 164 and 165 which are connected across the battery 157 and the battery 155. The plate of triode 160 is connected to the battery 157 through the plate resistor 166 and to the electrodes 118 and 120 of the first column of the target 116. Voltage dividers 156, 158 and 164, 165 are such that the tube 154 is normally conducting when there is no input from the input terminal 150. The junction of resistors 156 and 158 is normally at a higher potential than the junction of the resistors 164 and 165. The two triodes 154 and 160 are essentially in a flip-flop arrangement so that a negative pulse entered at terminal 150 will cause the triode 154 to extinguish and the triode 160 to conduct. The digits are presented to the terminals 150 and 151 as short negative pulses for each 1 digit and a blanked, that is, no pulse for each 0 digit. The pulses are entered to inputs 150 and 151 at the same time that the timing pulse is entered at input 152. As is hereinafter described the timing pulse initiates the blanking of the electron beam. The flip-flop operation therefore due to an input at 150 or 151 occurs during the time that the beam is blanked.

When a negative pulse is entered to terminal 150 corresponding to a 1 digit, the grid of triode 154 blocks conduction through the triode 154. As the triode 154 stops conducting, the triode 160 commences to conduct due to its cathode becoming more negative and its grid more positive. When triode 154 conducts the electrodes 117, 119 and 121 are more negative than the collector electrode 133 as is hereinafter described. The flow of current through the resistor 163 produces the relatively negative potential upon the electrodes 117, 119 and 121. When the triode 154 ceases to conduct the potential rises on the electrodes 117, 119 and 121 and decreases on the electrodes 118 and 120 due to the flow of current through the resistor 166. The flip-flop action of the two triodes 154 and 160 therefore switches potentials upon the electrodes 117 through 121. In a similar manner a negative pulse to the terminal 151 causes the triodes 170 and 171 to reverse the polarity upon the electrodes 122 through 128. The resistors 172, 173, 174 and 175 are connected to the grids of triodes 170 and 171 across the batteries 155 and 157 to normally effect conduction through triode 170. The plates of triodes 170 and 171 are connected to the battery 157 through the resistors 176 and 177, respectively. The plate of triode 170 is also coupled to the grid of triode 171 through the coupling capacitor 179. The cathodes of the two triodes 170 and 171 are connected together to the battery 155 through the cathode resistor 180. When a negative pulse is entered through the capacitor 181 to the grid of triode 170 it causes the triode 170 to stop conducting and the triode 171 to commence conducting. The potential of the electrodes 122 through 128 are thereby reversed with the electrodes 122, 124, 126 and 128 becoming more positive and the electrodes 123, 125 and 127 becoming more negative. Depending therefore upon the input pulse to the terminals 150 and 151 the electrodes 117 through 128 can or cannot provide an effective secondary emission to the collector electrode 133. The electrodes 129 through 132 are permanently biased; the electrodes 129 and 131 being connected to the junction of the resistors 214 and 215 and the electrodes 130 and 132 being connected through the resistor 216 and potentiometer 217 to the negative battery 218. The resistor 214 is connected to the battery 192 described above supplying a positive potential at a voltage of 150 volts across the series connected resistors 214 and 215. The junction of the resistors 214 and 215 and the electrodes 129 and 131 are at a voltage of approximately +30 volts. The electrodes 130 and 132 are at a voltage of approximately —20 volts and the collector electrode 133 is slightly negative at a voltage of approximately —2 volts. The electrodes 131 and 129 are always negative with respect to the electrode 133 even at maximum secondary emission therefrom which lowers the potential of the collector electrode 133. The electrodes 130 and 132 are always at a higher potential than the electrode 133 and thus do not produce effective secondary emission to the electrode 133.

The collector electrode 133 is also connected to the control grid of the pentode 190. The pentode 190 is part of the feedback amplifier circuit which controls the potentials upon the vertical plates 114 and 115 as is hereinafter described. The secondary electrons picked up by the collector electrode 133 cause the collector electrode 133 to become more negative and by so doing change the flow of current through the pentode 190. The greater the secondary emission to the collector 133 the more negative is the control grid of the pentode 190 and the less current flows therethrough. The screen grid of the pentode 190 and the plate of the pentode 190 are connected to the positive battery 192 through the plate resistor 191 and the suppressor grid is connected to the cathode and to ground. When the collector 133 picks up the secondary emission from the target 116 the pentode 190 has a reduced current therethrough from the battery 192 to ground and a positive potential is placed upon the control grid of the push-pull tube 193 as the plate of pentode 190 becomes more positive. If no secondary electrons are picked up by the collector 133 there is no input to the control grid of the pentode 190 and the pentode 190 has a maximum current therethrough causing the control grid of the tube 193 to become relatively negative. When no effective secondary emission occurs to the collector electrode 133 there is no input to the control grid of the tube 190, and the tube 193 provides a maximum value of plate current. The control grid of tube 193 is also connected through the resistor 230 and the capacitor 231 which are feed back stabilizing elements to ground. The pentode 193 is in a push-pull relationship with pentode 194 with the two cathodes and suppressor grids being connected together and through the resistor 195 to ground. The resistor 195 supplies the local feed back for the phase inversion of the push-pull relationship. When the current through pentode 193 is reduced the cathodes become more negative due to the smaller amount of current through the resistor 195. The potential of the control grid of tube 194 is fixed with respect to ground through the potentiometer 198 and so the tube 194 passes a greater amount of current. The two tubes 193 and 194 pass equal amounts of current when the electron beam impinges half upon an effective emitting surface and half upon a non-effective emitting surface. If the electron beam moves completely to an effective emitting surface of the target 116 the current through tube 190 reduces, the current through tube 193 reduces, and the current through tube 194 increases. If the electron beam moves completely to a non-effective emitting surface of the target 116 the current through tubes 190 and 193 increases, and the current through tube 194 decreases. The screen grids of the pentodes 193 and 194 are connected together to positive battery 197. The control grid of the tube 194 is connected to the variable tap of the potentiometer 198 as described above and through the capacitor 199 to ground. The battery 197 provides a constant voltage upon the control grid of tube 194 and the screen grids of tubes 193 and 194. The potentiometer 198 provides for an adjustment of the vertical deflection by varying the potential of the control grid of tube 194 and thus changing the balance of the push-pull circuit. The control grid of tube 194 is by-passed to ground by the capacitor 199 and is provided with direct-current adjustment, as described above, for positioning the beam under no-signal conditions. The potentials upon the control grids of the tubes 193 and 194 differ at most by a potential of the order of the signal voltage to the grid of tube 193. The plate current of the tube 193 essentially controls the potential to the vertical plate 115 of the cathode-ray tube 110 and the plate current of the tube 194 controls the potential to the vertical plate 114. The anode of the tube 193 is connected to a positive battery 200 through the resistor 201 and to ground through the resistor 202 and capacitor 203. Similarly, the anode of the tube 194 is connected to the battery 200 through the anode resistor 205 and to ground through the resistor 206 and capacitor 207. The anode of the tube 193 is also connected to the plate 115 of the cathode-ray tube 110 through the parallel combination of the resistor 208 and capacitor 209. The anode of the tube 194 is connected to the vertical deflection plate 114 through the parallel combination of the resistor 210 and capacitor 211. The potential of the output anodes of the vertical deflection amplifier tubes 193 and 194 is approximately 200 volts. The resistor 210 is connected to a resistor 232 and through the potentiometer 233 to the negative voltage terminal 234 of —150 volts. The resistors 210 and 232 act as a voltage divider and provide for a large negative voltage drop from the anode of tube 194 to the vertical deflection plate 114 which is approximately 20 volts below the potential of the collector electrode 33, or at approximately —2 volts. Similarly the resistor 208 is connected to a resistor 235 and thence through the potentiometer 233 to negative voltage terminal 234 to provide a voltage of approximately —2 volts for the plate 115. The voltage dividers consisting of the resistances 210, 232 and 208, 235 are padded with the capacitors 211 and 209, respectively, which match the capacitance across the deflection plates 114 and 115 providing a voltage division independent of frequency.

The potential upon the deflection plates 114 and 115 is dependent upon the conduction conditions of the tubes 193 and 194 which in turn depend upon the conduction condition of the tube 190. The tube 190 conducts greater or lesser current depending upon the amount of secondary electrons picked up by the collector electrode 133.

It is desirable that the feedback circuit, described above, be stable so that a desired beam position will be maintained without oscillation, hunting or flutter. The stable condition is not absolutely necessary for operation unless the vertical separation between the desired beam positions is comparable to the effective width of the beam. In order to provide for a stable feedback circuit the transconductances of the tubes 190, 193 and 194, the transconductance of the deflection to collector electrodes of the beam tube 110 and the major parasitic capacities in the circuit should be known. A stable design having adequate gain and sufficient band width for switching at a rate of one column per $10^{-5}$ seconds for a particular beam guide tube 110 of the present invention at a particular accelerating potential can be obtained, by way of example, with the following circuit values:

| | | |
|---|---|---|
| Tube 190 | | 6AK5 |
| Tubes 193 and 194 | | 6AG7 |
| Resistor 191 | ohms | 2400 |
| Resistors 201 and 205 | do | 3100 |
| Resistor 195 | do | 2000 |
| Resistor 230 | do | 6800 |
| Resistors 202 and 206 | do | 1200 |
| Capacitor 231 | M. M. F. | 12 |
| Capacitors 203 and 207 | M. M. F. | 220 |

The basic gain requirement of the feedback circuit is that full collector current flowing through resistors 236 and 238, hereinafter described, should be sufficient to move the beam vertically across the target 116.

At the same time that a negative pulse is entered to the input terminals 150 and 151 depending upon the binary digits entered, as described above, a negative pulse is entered to the timing input terminal 152. The terminal 152 is connected to the grid of the triode 220 through the coupling capacitor 221. The grid of the triode 220 is connected to the junction between the resistors 222 and 223 which are connected across the negative 150-volt battery 224. The triode 220 is in a flip-flop relationship with the triode 225 having the two cathodes connected together to the battery 224 through the cathode resistor 226, and the plate of triode 220 connected through the capacitor 227 to the grid of triode 225. The plate of the triode 220 is also connected to ground through the resistor 243. The grid of the triode 225 is connected to ground through the resistor 240 and to the negative battery of —150 volts, 241, through the resistor 242. When a negative pulse is entered to the input terminal 152 it causes the triode 220 to stop conductng and the triode 225 to commence conducting. The trode 225 is ordinarily biased to non-conductance by means of the negative battery 241 and by means of a negative potential from the plate of the triode 220 during the normal conduction thereof. When, however, the triode 220 stops conducting its plate potential rises to ground potential causing the potential of the grid of triode 225 to rise. The voltage divider comprising resistors 242 and 240 does not supply a sufficient negative potential to prevent the triode 225 from conducting when the triode 220 is not conducting. The triode 225 therefore conducts with the plate current flowing through the potentiometer 244 and rheostat 245 to ground. The flow of plate current through the triode 225 is of somewhat longer duration than the short negative pulse on terminal 152. The negative pulse produced due to the conduction of triode 225 is applied through the capacitor 246 to the intensity grid 111 of the beam guide tube 110. The negative pulse is shown in Fig. 2A at 60 and as described above in reference thereto, blanks the electron beam of the beam guide tube 110. The flip-flop circuit comprising the triodes 225 and 220 is so designed so as to provide a negative pulse of sufficient amplitude to completely cut off the electron beam. The intensity grid 111 is normally biased through the resistor 247 whch is connected to the negative source 234 described above.

The same negative pulse produced by the triode 225 appears fractionated across the rheostat 245. The negative pulse across the rheostat 245 provides a negative potential through the resistor 238 to the grid of the pentode 190 which is equivalent to the potential supplied by one-half the maximum collector current. The interruption therefore of the beam current by the grid 111 is largely compensated with respect to vertical deflection by the application of a negative potential to the control grid of the pentode 190. The resistors 217 and 237 described above are such as to bring their junction to a potential of approximately —2 volts so that when half the maximum collector current enters the collector 133 the bias of the pentode 190 provides for quiescent operation or balancing of the push-pull tubes 193 and 194. When the beam is blanked by the application of the negative pulse to the grid 111, the vertical postion of the beam is therefore maintained due to the action of a negative pulse being entered to the control grid of the pentode 190 and also due to the inherent capacitance to the input of the feedback circuit. These capacitances occur between the collector electrode 133 and the target 116 and between the collector electrode 133 and the various other components of the tube 110. This input capacitance to the feedback circuit tends to maintain the vertical postion of the electron beam during its blanking by the grid 111 and rapid fly-back hereinafter described. The negative pulse provided by the conduction of the triode 225 essentially replaces the leakage current of the feedback input capacitance as the capacitance tends to discharge so that a constant value is effectively provided. The blanking of the electron beam and the fly-back or return of the horizontal sweep as hereinafter described is of sufficiently short duration to maintain a constant input to the feedback circuit.

The negative pulse produced by the triode 225 also appears fractionated by means of the potentiometer 244 to the grid of another triode 250 through the parallel circuit of resistor 251 and capacitor 252. The parallel circuitry of the resistor 251 and capacitor 252 has a time constant which is equal to the fly-back time or to the time required for the return of the electron beam from the right to the left of the target 116. The normally conducting triode 250 receives plate potential from the battery 192 described above. The triode 250 is a cathode follower with its cathode connected to ground through the resistor 253 and also through the rectifier 254 and resistor 255 connected in parallel and the capacitor 256. The negative pulse to the grid of the triode 250 results in stopping conduction therethrough and in driving the potential across the capacitor 256 negative through the low impedance direction of the diode 254. When the cathode of triode 250 restores to normal, the capacitor 256 is restored more slowly due to the leakage in the reverse direction through the diode 254 and through the high resistance of the resistor 255. This rapidly descending and slowly ascending pulse is applied to the horizontal deflection amplifier which comprises the push-pull pentodes 260 and 261. The junction of the parallel circuit of the diode 254 and resistor 255, and the capacitor 256 is connected to the control grid of the pentode 260. The amplifier comprising the pentodes 260 and 261 is essentially the same as the feedback amplifier comprising the pentodes 193 and 194 with the exception that the various circuit components necessary for stability are not required. The cathodes and the suppressor grids of the pentodes 260 and 261 are connected together and thence through the resistor 262 to ground. The screen grids are connected together and thence through the diode 263 which is a gas discharge, voltage regulator tube, to the positive battery 264 and also through the potentiometer 265 to ground. The control grid of the pentode 261 is connected to the variable tap of the potentiometer 265 and through the by-pass capacitor 266 to ground. The plate of the pentode 260 is connected through the parallel circuit of the resistor 267 and capacitor 268 to the horizontal deflection plate 113 and the plate of the pentode 261 is connected through the parallel circuit of the resistor 269 and capacitor 270 to the horizontal deflection plate 112. When the negative pulse is supplied by the cathode of the triode 250, the pentode 260 has the plate current reduced therethrough and the pentode 261 has the plate current increased therethrough. The decrease in current through the pentode 260 causes the horizontal deflection plate 112 to become more positive and the increase in current through the pentode 261 causes the horizontal deflection plate 113 to become more negative. The electron beam is therefore moved quickly from the right to the left of the target 116. When the triode 250 stops conducting the capacitor 256 commences discharging through the diode 254 and resistance 255, as described above, resulting in a greater current through the pentode 260 and thus a lesser current through the pentode 261. The slow leakage from the capacitor 256 provides for the relatively slow movement from left to right of the electron beam across the target 116. Plate potential is supplied to the pentodes 260 and 261 through the resistors 272 and 273, respectively and the potential upon the plates 113 and 112 is supplied through the resistors 274 and 275 which are connected together and to the variable tap of the potentiometer 233 described above.

The introduction therefore of a negative pulse to the input terminal 152 provides effectively for three results: (1) a negative pulse is entered to the grid 111 to blank the electron beam; (2) a negative pulse equivalent to a pulse provided by one-half the maximum collector current is provided to the control grid of the pentode 190 to maintain the vertical position of the electron beam during fly-back or the blanking of the beam; and (3) a negative pulse is provided to the cathode-follower tube 250 which controls the operation of the horizontal sweep and recycle circuit comprising the pentodes 260 and 261.

If the two numbers to be added are 5 and 7, in binary notation 101 and 111, as described above in reference to Figs. 1 and 2, the sequence of operations occur as is hereinafter described. At the commencement of operation the electron beam impinges upon the right of the target 116, partially on the electrode 131 and partially on the electrode 132. The electrode 131 as described above is positive with respect to the collector electrode 133 and the electrode 132 is negative with respect to the collector electrode 133. The electrode 132 therefore provides effective secondary emission whereas the electrode 131 does not supply an effective secondary emission. If the beam drifts upward to have a greater portion thereof impinge upon the electrode 131 a lesser amount of effective secondary emission occurs. As the secondary electrons are picked up by collector electrode 133, the potential of collector electrode 133 is reduced and the grid of the pentode 190 becomes more positive. The increase in plate current through the tube 190 provides an increase in potential to the control grid of the pentode 193, thus increasing the plate current thereof. The increase in plate current of the pentode 193 causes a decrease in the plate current of the pentode 194 due to the push-pull circuitry. The increase in plate current through the pentode 193 causes the vertical deflection plate 115 to become more positive and the decrease in plate current of the pentode 194 causes the vertical deflection plate 114 to become more negative. The electron beam therefore is forced down if it tends to drift upward onto the electrode 131. The opposite sequence of events occurs with regards to vertical deflection if the electron beam tends to drift downward onto the electrode 132. When the beam drifts down, a greater amount of effective secondary emission occurs reducing the current through the pentodes 190 and 193 and increasing the plate current of the pentode 194. These changes in plate current cause the vertical deflection plate 114 to become more positive and the plate 115 to become more negative forcing the electron beam upward. The beam therefore remains partially impinging upon the electrode 131 and partially impinging upon the electrode 132.

The number 101 is, for example, entered at the input 150 and the number 111 is entered to the input 151. At the commencement of operation therefore with the electron beam impinging upon the electrodes 131 and 132, a short negative pulse is entered at input 150, 151 and also at timing input 152. The number indications are entered to the input terminals 150 and 151 with a short negative pulse corresponding to a 1 digit and no pulse being entered corresponding to a 0 digit. The numbers are entered from right to left, that is, from the units column to the two's column to the four's column, etc. In the units digit both numbers 101 and 111 have a 1 digit and so a negative pulse is entered to both terminals 150 and 151. The pulses entered at 150 and 151 cause the two flip-flop circuits comprising the triodes 154, 160 and 170, 171 to reverse conduction. With no pulse entered the tubes 154 and 170 normally conduct, but with a negative pulse entered to both terminals 150 and 151 the tubes 154 and 170 do not conduct and the tubes 160 and 171 do conduct. The conduction of the tubes 160 and 171 reverses the potentials upon the electrodes 117 through 128 with the electrodes 118, 120, 123, 125 and 127 becoming more negative with respect to the collector electrode 133 and thus becoming effective secondary emitters.

Simultaneous with the reversal of potential upon the electrodes 117 through 128 the negative pulse entered to terminal 152 causes the flip-flop operation of the triodes 220 and 225. The triode 225 conducts providing a negative pulse as described above which blanks the electron beam and returns it from its position partially upon electrodes 131 and 132 to the left upon electrode 120. The various circuit components in the two flip-flop circuits comprising the tubes 154, 160 and 170, 171 are such as to provide for the continued reversal of potential upon the electrodes 117 through 128 until the electron beam passes across the electrodes 117 through 128 to impinge upon one of the output electrodes 129 through 132. When the electron beam leaves the electrodes 122 through 129, the flip-flop circuits restore to normal, ready for the next pass.

When the tube 225 therefore stops conducting, the electron beam is restored, impinging upon the electrode 120. The electrodes 118, 120, 123, 125 and 127 remain relatively negative and the horizontal sweep circuit comprising the pentodes 260 and 261 starts to move the electron beam to the right. Since the electrode 120 is an effective secondary emitter due to its relatively negative potential, secondary electrons are picked up by the collector 133. The secondary electrons picked up by the collector electrode 133 as described above change the potentials upon the vertical deflection plates 114 and 115 to cause the electron beam to rise. The electron beam therefore moves up as it is moved horizontally across the electrode 120. The curves 2B, 2E, 2F and 2G apply to the operation of Fig. 3 as well as to Fig. 1 described above. From the upper right-hand corner of the electrode 120 the electron beam impinges upon the relatvely negative electrode 125. The collector electrode 133 continues to pick up secondary electrons and thus the electron beam continues to rise. From the upper right-hand corner of the electrode 125 the electron beam impinges upon the elctrode 130. The electrode 130 is permanently negative, as described above, with respect to the collector electrode 133 and thus effective secondary emission continues and the beam continues to rise. When the beam impinges partially upon the electrodes 130 and 129 a vertically stable position occurs. As the beam moves across to the electrode 130 the positive pulse 94 is provided to the output 290, as shown in Fig. 2F. The electron beam ending partially upon electrodes 129 and 130 at the end of the first pass instead of partially upon the electrodes 131 and 132, indicates that the carry to the second column is 1.

To start the second pass, or for the second column of the number 101, no pulse is entered to the input terminal 150, for the 111 number a negative pulse is again entered to the input terminal 151 and the timing pulse is entered to the terminal pulse 152. The beam is blanked and returned to the left at the same time that the potentials upon the electrodes 122 through 128 are reversed. The potentials upon the electrodes 117 through 121 remain in their normal or restored state with the potentials upon the electrodes 118 and 120 being relatively positive with respect to the collector electrode 133. When the beam is turned on it impinges upon the relatively positive electrode 118. The beam therefore moves down across the electrode 118 and from the lower right-hand corner thereof to the electrode 125. The electrode 125 is relatively negative with respect to the collector electrode 133 and causes the electron beam to move upward. From the upper right-hand corner of the electrode 125 the electron beam impinges upon the electrode 130. The electrode 130 is permanently negative with respect to the collector electrode 133, as described above, causing the electron beam to move upward to a position partially upon the electrodes 129 and 130. An output pulse is again provided to the terminal 290 indicating a 0 digit for the second column as was the case for the first column. During the third sequence of operations a negative pulse is entered at all three terminals 150, 151 and 152 indicating a 1 digit in the third column of both numbers. The electron beam is blanked and moved to the left to impinge upon the electrode 118. The electrode 118 is now negative with respect to the collector electrode 133 causing the electron beam to move to the upper right-hand corner thereof. From the upper right-hand corner of the electrode 118 the beam impinges upon the relatively negative electrode 123. The beam is therefore moved upward to the upper right-hand corner of the electrode 123 to impinge upon the electrode 129. The electrode 129 is permanently positive with respect to the collector electrode 133 causing the electron beam to descend. As the beam moves across the electrode 129 a negative pulse is generated across the resistor 215 providing an output indication at the terminal 291. The electron beam comes to rest again partially upon the electrode 129 and partially upon the electrode 130 indicating a 1 carry to the fourth column. There are no digits entered for the fourth sequence of operations and so the potentials upon the electrodes 117 through 128 remain unreversed in their restored state. When the beam is blanked and restored to the left, it again impinges upon the electrode 118. It is moved down across the electrode 118, down across the electrode 125, and down across the electrode 131 to partially impinge upon the electrode 131 and partially impinge upon the electrode 132. As the electron beam moves across the electrode 131 it provides an output indication to the terminal 291 indicating a 1 digit in the fourth column as was the case in the third column. The sum therefore of the two numbers 101 and 111 is 1100 and the operation is concluded.

It is evident that the specific embodiment of the invention shown and described is but illustrative and that various other modifications may be made therein without departing from the scope and spirit of the invention as defined in the appended claims.

What is claimed is:

1. An electronic computing circuit comprising a beam guide tube having means for providing an electron beam, vertical deflection means, horizontal deflection means, a collector electrode and a target, said target having summand and output plates; a source of sequences of pulses connected to said summand plates, each pulse expressing the value of a binary digit; output terminals connected to said output plates; a feedback circuit having an input connected to said collector electrode and an output to said vertical deflection means; a horizontal sweep and recycle circuit controlling said horizontal deflection means to sweep and recycle said electron beam horizontally across said target; and a timing circuit for blanking and maintaining the vertical position of said beam and for initiating the operation of said horizontal sweep and recycle circuit, the maintenance of said blanking and vertical position occurring simultaneously with the recycling of said electron beam.

2. An electronic computing circuit in accordance with claim 1 wherein said feedback circuit and said horizontal sweep and recycle circuit include timing means whereby for each of said plates the operation of said feedback circuit is completed before the operation of said horizontal sweep and recycle circuit.

3. An electronic computing device in accordance with claim 2 wherein some of said output plates comprise a carry area upon which said electron beam impinges at the termination of the horizontal sweep.

4. An electronic computing device in accordance with claim 3 wherein the output plates are four in number arranged in a column, and said carry areas are on the upper two output plates and are adjacent to each other.

5. An electron binary adder comprising an input circuit; a feedback circuit; a beam guide tube having means for generating a beam of electrons, horizontal deflection means, a collector electrode having a potential thereon and a target comprising a plurality of electrodes arranged in columns; and means including said horizontal deflection means for horizontally sweeping said electron beam across said target and for blanking said electron beam during fly-back while maintaining its vertical position, said input circuit applying in accordance with sets of conditions corresponding to the digits of the binary summands one of two potentials to a first plurality of said target electrodes and the second of said two potentials to a second plurality of said target electrodes, said first potential being negative and said second potential positive with respect to the potential of said collector electrode, said feedback circuit connecting said collector electrode and said vertical deflection means to control the vertical position of said beam in accordance with the relative potentials upon said target electrodes and said collector electrode.

6. An electron discharge device comprising a plurality of target electrodes having secondary electron emissive surfaces positioned in three columns; means for projecting an electron beam toward said target electrodes; a first deflection means effective when energized to sweep said beam horizontally across said three columns of target electrodes; a collector electrode positioned adjacent said target electrodes; a second deflection means controlled by the secondary emission from said target electrodes to said collector electrode to vertically position said electron beam as said electron beam is swept across said target electrodes by said first deflection means; a source of potential connected to said target electrodes and to said collector electrode providing a potential upon said collector electrode relatively positive with respect to the potential on some of said target electrodes in each of said columns and relatively negative with respect to the potential on the remainder of said target electrodes in said columns, and a source of sequences of pulses connected to and controlling the potentials upon said target electrodes of the first two of said columns.

7. An electronic discharge device in accordance with claim 6 comprising in addition output terminals connected to, and the potential thereupon controlled by, the third of said columns.

8. In a calculating device, including means for forming a beam of electrons and horizontal and vertical deflection means for determining the position of said beam, the combination of a multielectrode target having secondary electron emitting surfaces and consisting of a plurality of columns of electrodes, a source of sequences of pulses applied to the electrodes of each of said columns except one in accordance with one of two conditions of a plurality of conditions expressing binary numbers; a collector electrode positioned adjacent said target; and a potential source connected to said collector electrode causing the potential upon said collector electrode to be negative with respect to some of said electrodes in each of said columns of electrodes and positive with respect to the potential upon the remainder of said electrodes in each of said columns of electrodes, the relative potentials of said electrodes of said target with respect to said collector electrode controlling the vertical position of said electron beam as it is horizontally swept across said target to perform a calculation with the binary numbers expressed by said plurality of conditions.

9. In a single sweep electronic binary adder including means for forming a beam of electrons and horizontal and vertical deflection means for determining the position of said beam, the combination of a multielectrode target having secondary electron emitting surfaces and consisting of a plurality of columns of electrodes, an input circuit connected to said electrodes determining the potentials upon the electrodes of two out of each three columns in accordance with one of two conditions of a plurality of conditions equal in number to two-thirds said plurality of columns of electrodes; a collector electrode; and a potential source connected to said collector electrode causing said collector electrode to be negative with respect to the potential upon some of said electrodes of said columns of electrodes and positive with respect to the potential upon the remainder of said electrodes of said columns of electrodes, the relative potentials upon said electrodes of said target with respect to said collector electrode controlling the vertical position of said electron beam as it is horizontally swept across said target, the addition of the binary numbers being accomplished in a single sweep of said beam across said multielectrode target.

10. In an electronic computing circuit for summing simultaneously a plurality of binary numbers including means for forming a beam of electrons and horizontal and vertical deflection means for determining the position of said beam, the combination of a multielectrode target having secondary electron emitting surfaces and consisting of a plurality of columns of electrodes, an input circuit connected to said electrodes determining the potentials upon the electrodes of each of said columns except one in accordance with one of two conditions of a plurality of conditions, said plurality of columns of electrodes less one being no smaller in number than the plurality of binary numbers simultaneously to be added; a collector electrode; and a potential source connected to said collector electrode causing said collector electrode to be negative with respect to the potential upon some of said electrodes in each of said columns of electrodes and positive with respect to the potential upon the remainder of said electrodes in each of said columns of electrodes, the relative potentials upon said electrodes of said target with respect to said collector electrode controlling said vertical deflection means to control the vertical position of said electron beam as it is horizontally swept across said target to provide the summation of the plurality of binary numbers.

11. In an electronic computing circuit for summing simultaneously a plurality of binary numbers including means for forming a beam of electrons and horizontal and vertical deflection means for determining the position of said beam, the combination of a multielectrode target having secondary electron emitting surfaces and consisting of a plurality of columns of electrodes, said columns of electrodes being arranged in groups with one column in each group being an output column, an input circuit connected to said electrodes for determining the potentials upon the electrodes of each of said columns except said output columns in accordance with one of two conditions of a plurality of sets of conditions; a collector electrode; a potential source connected to said collector electrode, the potential upon said collector electrode being negative with respect to the potential upon some of said electrodes of said columns of electrodes and positive with respect to the potential upon the remainder of said electrodes of said columns of electrodes, the relative potentials of said electrodes of said target with respect to said collector electrode controlling said vertical deflection means to control the vertical position of said electron beam as said beam is swept horizontally by said horizontal deflection means across said target, and output terminals connected to said output electrodes to provide for an indication of the sum of the plurality of numbers in a single sweep of said beam.

12. An electron computing discharge device comprising a plurality of target electrodes having a secondary electron emission coefficient greater than one positioned in three columns; means for projecting an electron beam toward said target electrodes, a first deflection means effective when energized to sweep said beam horizontally across said three columns of target electrodes; a collector electrode positioned adjacent said target electrodes; a second deflection means controlled by the secondary emission from said target electrodes upon said collector electrode to vertically position said electron beam as said electron beam is swept across said target electrodes; a potential source connected to said target electrodes and to said collector electrode providing a relatively positive potential upon some of said electrodes in each of said columns with respect to said collector electrode and a relatively negative potential upon the remainder of said electrodes in said columns with respect to said collector electrode; an input circuit connected to two of said columns for controlling the potentials upon said electrodes of said two columns in response to one of two conditions for each of said columns, the operation of said first deflection means effecting the movement of said electron beam across an electrode in said third of said columns to provide for the output response from said electron discharge device, the third of said columns having a carry and a no-carry position, the final position of said beam in said third column being upon one of said positions to determine the carry; and a recycle circuit for maintaining the final vertical position of said beam during fly-back to present the carry as a summand in the next sweep of said beam.

13. An electron computing discharge device comprising a plurality of target electrodes having a secondary emission coefficient greater than one positioned in three columns; means for projecting an electron beam toward said target electrodes; a first deflection means effective when energized to successively sweep and fly back said beam horizontally across said three columns of target electrodes; a collector electrode positioned adjacent said target electrodes; a second deflection means controlled by the secondary emission from said target electrodes upon said collector electrodes to vertically position said electron beam as said electron beam is swept across said target electrodes; a potential source connected to said collector electrode providing a potential relatively positive with respect to the potential upon some of said electrodes in each of said columns and relatively negative with respect to the potential upon the remainder of said electrodes in said columns; and output terminals connected to said target electrodes in one of said columns, each horizontal sweep of said beam providing for an output to said output terminals and a stored carry in accordance with the vertical position of said electron beam.

14. An electron computing discharge device comprising a plurality of target electrodes having a secondary electron emission coefficient greater than unity positioned in three columns; means for projecting an electron beam toward said target electrodes; a first deflection means effective when energized to sweep said beam horizontally across said three columns of target electrodes; a collector electrode positioned adjacent said target electrodes; a second deflection means controlled by the secondary emission from said target electrodes upon said collector electrodes to vertically position said electron beam as said electron beam is swept across said target electrodes; a potential source connected to said collector electrode providing a potential relatively positive with respect to the potential upon some of said electrodes in each of said columns and relatively negative with respect to the remainder of said electrodes in said columns; and a binary input circuit connected to said columns for controlling the potentials upon two of said three columns in accordance with the respective digits of the summands to be added said input circuit providing a relatively negative potential in accordance with a 1 digit and a relatively positive potential in accordance with the 0 digit with respect to the potential upon said collector electrode.

15. In an electronic binary adder including means for forming a beam of electrons and horizontal and vertical deflection means for determining the position of said beam, the combination of a multielectrode target having secondary electron emitting surfaces and consisting of a plurality of columns of electrodes, an input circuit connected to said target for applying potentials upon the electrodes of two out of each three columns in accordance to the 0 or 1 digits of the summands; a collector electrode and a potential source connected thereto, the potential upon said collector electrode being negative with respect to some of said electrodes of said columns of electrodes and positive with respect to the potential upon the remainder of said electrodes of said columns of electrodes, the relative potentials of said electrodes of said target with respect to the potential upon said collector electrode controlling the vertical position of said electron beam as it is horizontally swept across said target, the third of said columns being responsive upon each successive horizontal sweep of said beam to express a 0 or a 1 output.

16. An electron adding discharge device comprising a plurality of target electrodes having a secondary electron emission coefficient greater than unity; means for projecting an electron beam towards said target electrodes; a first deflection means effective when energized to successively sweep said beam horizontally across said target electrodes; a collector electrode positioned adjacent said target electrodes; a second deflection means controlled by the secondary emission from said target electrodes upon said collector electrode to vertically position said electron beam as said electron beam is successively swept across said target electrodes, an input circuit for applying to said target electrodes a sequence of potentials in accordance to the binary digits of the summands to be added; a potential source connected to said collector electrode providing a potential relatively positive with respect to the potential upon some of said target electrodes and relatively negative with respect to the potential upon the remainder of said target electrodes, said input circuit reversing the potentials upon some of said target electrodes to indicate a 1 digit of said summands, said second deflection means causing said electron beam to be restrained to the upper edge of those of said target electrodes that have a potential reversal and becoming relatively negative with respect to the potential upon said collector electrode, said second deflection means causing said electron beam to be restrained to the lower edge of those of said target electrodes that have a potential reversal and becoming positive with respect to said collector electrode in accordance with said reversal.

17. An electronic binary adder comprising a plurality of target electrodes each having an upper and a lower edge and each having a secondary electron emission coefficient greater than unity; means for projecting an electron beam towards said target electrodes; a first deflection means effective when energized to sweep said beam horizontally across said target electrodes; a collector electrode positioned adjacent said target electrodes; a second deflection means controlled by the secondary emission from said target electrodes upon said collector electrode to vertically position said electron beam as said electron beam is horizontally swept across said target electrodes; an input circuit connected to said target electrodes causing some of said target electrodes to be positive with respect to the potential upon said collector electrode and the remainder of said target electrodes to be negative with respect to the potential upon said collector electrode, a control circuit connected to said target electrodes for applying an input pulse in accordance with a 0 digit to maintain said relatively negative potentials of said target electrodes, and another input pulse in accordance with the 1 digit to reverse said relatively negative and positive potentials upon some of said target electrodes, said second deflection means causing said electron beam to be restrained to the upper edge of those of said target electrodes which have a potential reversal to become relatively negative with respect to said collector electrode, and to be restrained to the lower edge of those of said target electrodes which have a potential reversal and become positive with respect to said collector electrode in accordance with said reversal.

18. An electron beam adding device comprising in combination a plurality of summand targets, a plurality of output targets, deflection means, and means for selectively directing the beam of said device upon said summand targets for the activation thereof in accordance with a plurality of digits to be added, said selective means including means responsive to the activated ones of said summand targets by said beam for controlling the operation of said deflection means to direct said beam upon said ouput targets in accordance with the sum of said digits, and means responsive to the activated ones of said output targets by said beam for providing an indication of the carry and of the output, said target electrodes being disposed in overlap relation so that said beam impinges wholly upon one or a plurality of said targets, the impingement of said beam on two of said output targets providing an indication of the carry.

19. An electron beam adding device in accordance with claim 18 wherein said first-mentioned means comprises horizontal deflection means, said beam being deflected from impinging upon two of said electrodes to impinge upon one of said electrodes by said horizontal deflection means.

References Cited in the file of this patent

UNITED STATES PATENTS

| | | |
|---|---|---|
| 2,463,535 | Hecht | Mar. 8, 1949 |
| 2,473,691 | Meacham | June 21, 1949 |
| 2,496,633 | Llewelyn | Feb. 7, 1950 |
| 2,498,081 | Joel et al. | Feb. 21, 1950 |
| 2,522,291 | Morrison | Sept. 12, 1950 |
| 2,576,040 | Pierce et al. | Nov. 20, 1951 |
| 2,599,949 | Skellett | June 10, 1952 |
| 2,692,727 | Hobbs et al. | Oct. 26, 1954 |